Sept. 29, 1936.  E. J. SIMON  2,055,508
MACHINE FOR SEALING FOLDERS
Filed May 14, 1934  3 Sheets-Sheet 1
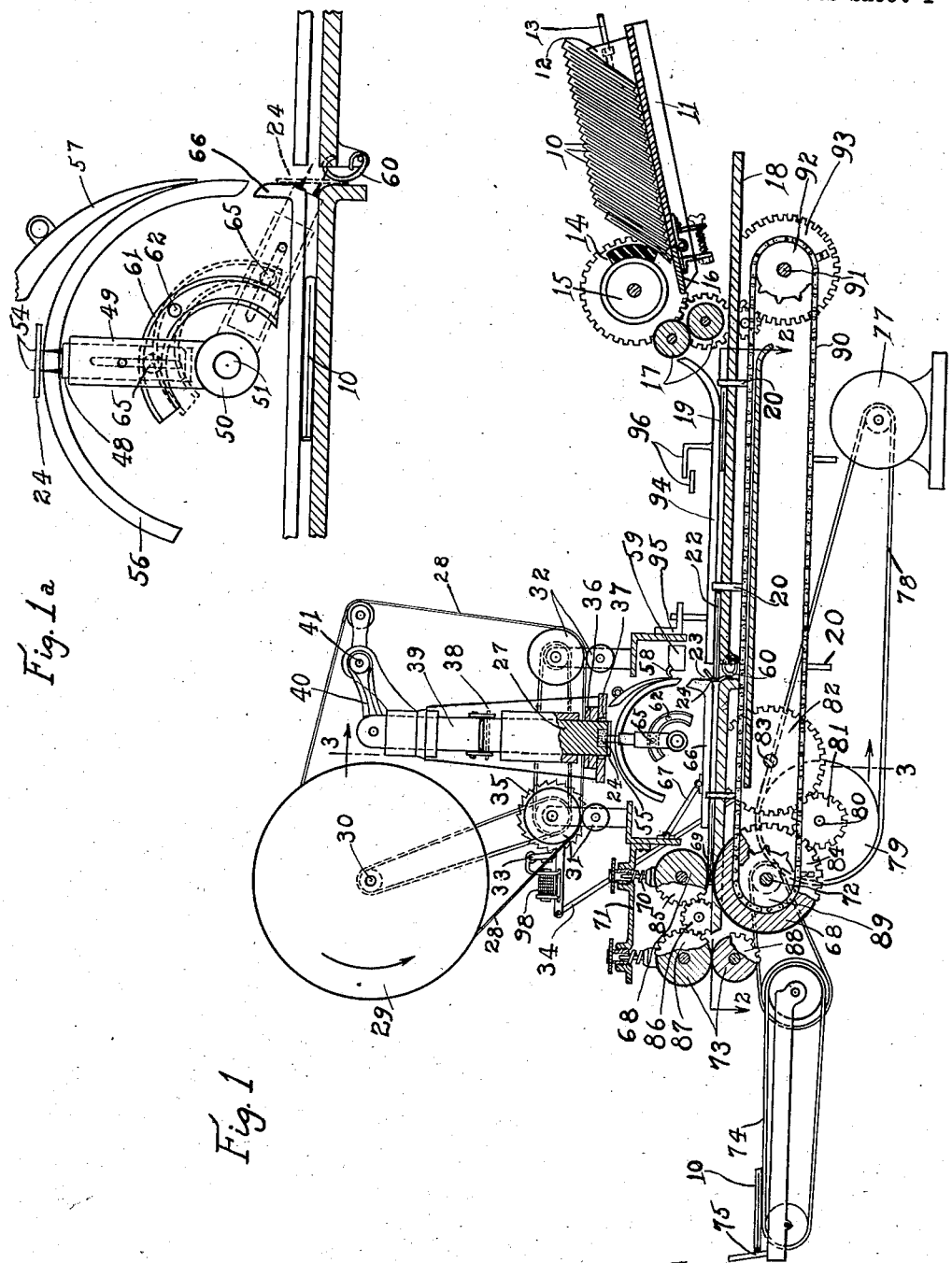
Inventor.
Eaross J. Simon,
By Kent W. Worrell
atty.

Sept. 29, 1936.  E. J. SIMON  2,055,508
MACHINE FOR SEALING FOLDERS
Filed May 14, 1934   3 Sheets-Sheet 2
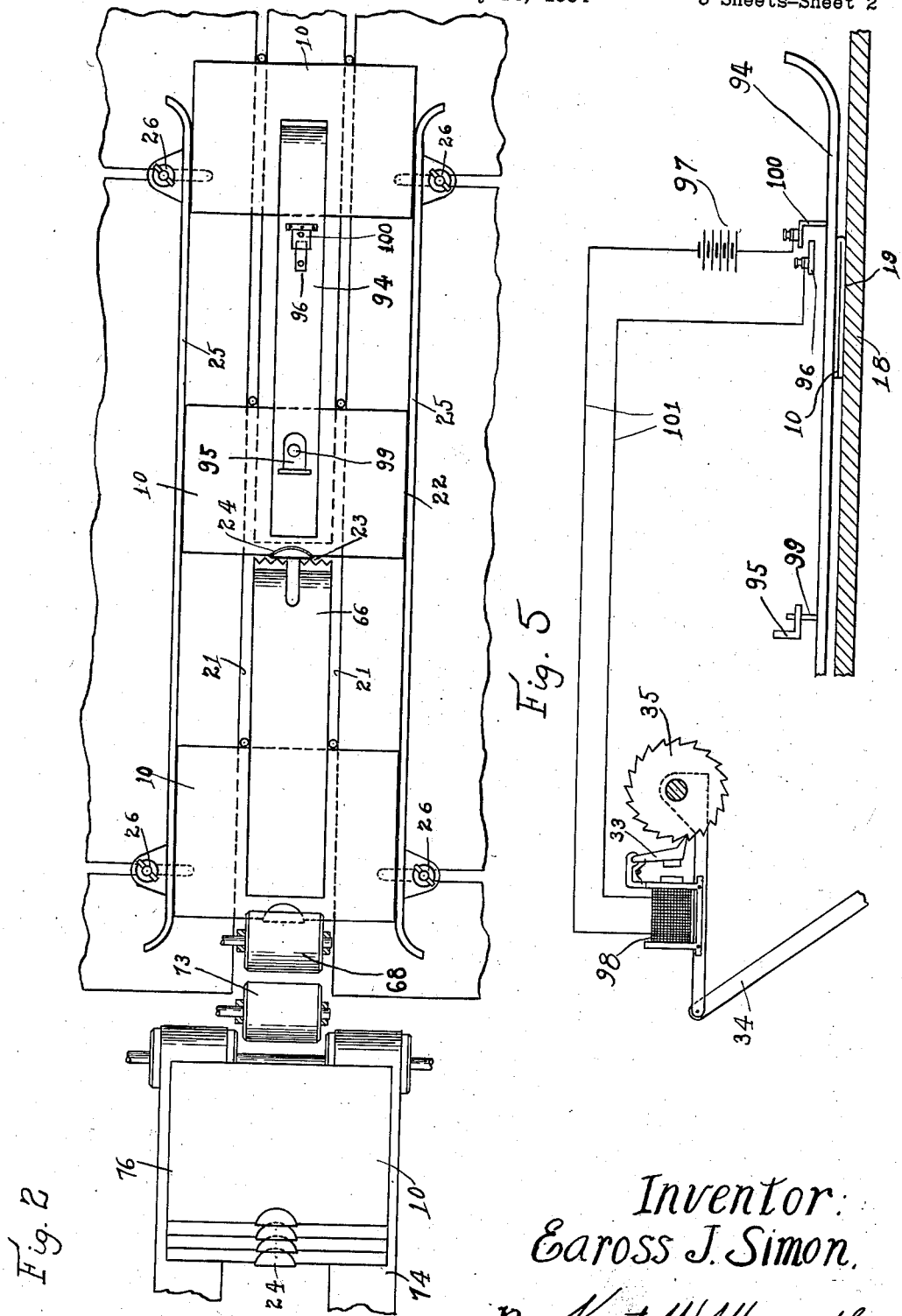
Inventor:
Eaross J. Simon,
By Kent W. Wonnell
   atty.

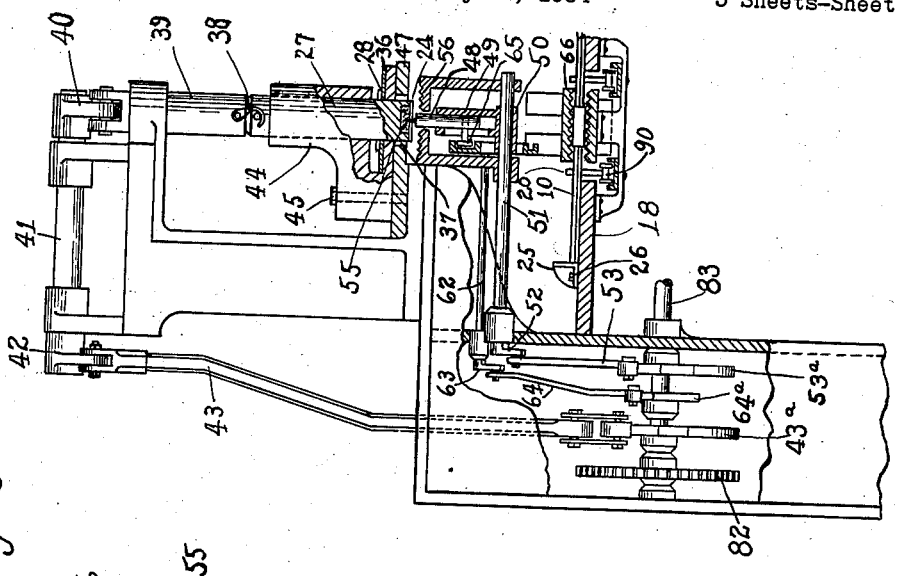

Patented Sept. 29, 1936

2,055,508

UNITED STATES PATENT OFFICE 2,055,508

MACHINE FOR SEALING FOLDERS

Eaross J. Simon, Chicago, Ill., assignor to
Henry C. Scholz, West Pullman, Ill.

Application May 14, 1934, Serial No. 725,478

12 Claims. (Cl. 216—27)

This invention relates to machines for automatically attaching gummed seals to paper folders in such a way as to fasten together the open edges of the latter, and is particularly concerned with certain hereinafter disclosed improvements which serve to greatly increase the efficiency of such machines.

The purpose of the present invention, generally stated, is to provide an improved folder sealing machine which is absolutely dependable in operation.

Other objects and advantages of the invention will be apparent to those skilled in the art from the following disclosure of the construction, arrangement and operation of the machine.

In order that the invention may be readily understood one form of the same is presented herein for the purpose of exemplification, as shown more particularly in the accompanying drawings, in which, Fig. 1 is a longitudinal section through a machine constructed in accordance with the invention;

Fig. 1a is an enlarged view of the seal delivery parts;

Fig. 2 is a fragmentary plan view of the bed of the machine over which the folders are caused to move, observed from approximately the line 2—2 of Fig. 1;

Fig. 3 is a vertical transverse section through the machine taken approximately on the line 3—3 of Fig. 1;

Fig. 4 is a plan view of the die plate in which the seals are cut;

Figs. 4a and 4b show seals of different shapes;

Fig. 5 is a schematic view showing the device for automatically stopping the feeding of the gummed tape to the die and the movement of the cut seals into fastening position upon the failure of a folder to be advanced to the seal-attaching position; and Fig. 6 is a perspective view of a folder, showing the manner in which the machine of the invention applies a seal to the open edges of the folder.

In the particular machine which is shown in the drawings by way of illustration, the folders 10 to which seals are to be applied are stacked in an inclined chute 11 with the closed edges of the folders uppermost. The folders are urged downwardly in the chute by a weighted follower 12 which is slidably mounted upon laterally spaced guide rods 13, which rods may also serve as guides for the side edges of the folders. In the operation of the machine, the lowermost folder 10 in the chute 11 is engaged frictionally by a segment 14 of rubber or other suitable material mounted on a smooth frictionless rotating roller 15 and is moved by reason of such engagement down over the lower upwardly spring-pressed end 16 of the chute into a position between two more rapidly rotating rollers 17 which rollers thereupon deposit the folder on the bed 18 of the machine in a position 19.

From position 19 the folder 10 is slid along the table by two laterally spaced fingers 20 which project from an endless movable chain 90 through slots 21 into engagements with the rear closed edges of the folder. The fingers 20 move the folders 10 along the bed of the machine to a position 22 in readiness to have a gummed seal 24 applied to the open edge thereof at 23.

In being moved from the position 19 to the position 22 the folder 10 is prevented from shifting sidewise by a pair of properly spaced guide strips 25 which are adjustably attached in slots 20 of the bed 18 by bolts 26.

The seals which are applied to the folders are cut by a vertically reciprocating die 27 from a gummed tape 28 which is fed from a spool 29 on a spindle 30 to a similar spool (not shown) on the spindle 30 behind the spool 29. In approaching and leaving the die 27, the tape passes between a pair of feed rolls 31 and a second pair of feed rolls 32. One of the rolls 31 is intermittently rotated a portion of a rotation by an inwardly spring-pressed oscillating pawl 33 which is pivotally mounted on an operating arm 34 in one-way driving engagement with a ratchet wheel 35 connected to the roll whereby to cause the tape 28 passing between the rolls to advance intermittently beneath the die 27 across the upper surface of a cutting die plate 36, which plate has a suitably shaped aperture 37 therein for the reception of the die.

The die 27 is detachably connected at 38 to a vertically reciprocating plunger 39 connected to an arm 40 which is stationary on shaft 41. A similar arm 42 is stationary on the opposite end of shaft 41 and to arm 42 is connected a vertically reciprocating arm 43 for actuating the plunger 39.

A die plate 36 is permanently attached to die shoe 44. To produce and apply a different shaped seal, it is merely necessary to remove a cap screw 45, replace die shoe 44 with a die shoe and plate 46 and substitute a die corresponding in cross sectional shape to that particular aperture in die shoe and plate 46, and replace cap screw 45. The machine is then ready to cut out and apply seals 24a and 24b of different shapes as shown by Figs. 4a or 4b.

In reciprocating into and out of the aperture 37 of the die plate, the die 27 is guided in its movements by the die shoe 44 which is rigidly associated with a stationary plate 47. The die shoe 44 is provided with apertures in alignment with die plate 36, and the shank of the die is guided in the particular aperture in the plate 36 through which the die moves in cutting the seal from the tape. The seal 24 upon being cut by the die 27 is forced downwardly by the bottom of the die onto a carrier 48.

The carrier 48 consists of a piston and cylinder 49 mounted on a hub 50 which is fixed to a shaft 51. A lever arm 52 is also fixed to shaft 51 and is actuated by an operating arm 53 to rotate the shaft.

The carrier 48 projects upwardly from hub 50 and is provided with a set of two or more sharp pins 54 on its end. When in an upright position the carrier 48 is directly beneath the aperture in the die plate 36, and the die 27 upon passing downwardly through such aperture, impales the cut seal upon the pins 54, the upper end of the pins entering a yieldable insert 55 of cork or other suitable material in the bottom of the die. When the die thereafter moves upwardly, the seal remains in a substantially horizontal position upon the pins 54, and when the carrier 48 thereafter commences to rotate, the seal moves in a circular path between an inner pair of laterally spaced guide strips 56 curved concentrically with respect to the shaft 51 and an outer pair of laterally spaced guide strips 57 which are also curved with respect to shaft 51.

The tape 28 is arranged with its gummed face uppermost where it passes over the die plate 36, with the result that the seal is impaled on the pins 54 with the gummed face toward the outer guide strips 57. As the seal moves downwardly in an arc with the carrier 48, a brush 58 which is supplied with water from a container 59, moistens the gummed face of the seal, and when the seal has traveled approximately 120° the seal is impaled between a sensitive spring 60 which holds the seal firmly in place for an approaching folder which is in the position 22.

When the carrier 48 commences to rotate downwardly it is gradually moved outwardly by the action of a half circle channel arm 61 which is rigidly mounted on a pivot shaft 62. A lever arm 63 is secured to the shaft 62 and is operated by a vertically reciprocating arm 64. When carrier 48 has traveled approximately 120° and the seal has been impaled between the spring 60 and the bed of the machine, the action of shaft 62 withdraws the pins 54 from the seal and the carrier is moved to its upright position by its shaft 51. The carrier 48 is rotated and moved outwardly and inwardly by the action of a roller 65 which projects from the carrier. The roller 65 moves within and is guided by the channel of the half circle channel arm 61.

After the seal 24 has been impaled between spring 60 and the bed of the machine in position 23, the folder 10, which is being moved along the bed of the machine by fingers 20, comes in contact with a seal 24 in position 22 and forces the seal between the bed of the machine and a presser foot 66 in such a manner that half of the seal is glued to the top of the folder and the other half of the seal to the bottom of the folder. By being glued to the open edge of the folder in this manner, the seal prevents the folder from being opened without first breaking the seal.

The presser foot 66 is supported by arms 67 and when a sealed folder is moved past it by fingers 20, it is engaged by a pair of rollers 68 in position 69. These rollers are used for the sole purpose of pressing the seal firmly to the folder. The top roller is pressed downwardly by a spring 70, the roller being attached to a frame 71 of the machine and the bottom roller is mounted on a shaft 72. After the folder has passed from between the first set of rollers 68, it is engaged by two more similar rollers 73. After the folder has passed between the rollers 73, the folder drops upon a slowly moving conveyor 74 which packs the folders one on top of the other against a back stop 75. The folders drop on the conveyor in the manner as shown in position 76, Fig. 2.

The several moving parts of the machine may be operated from a motor 77 by means of a belt 78 which extends about a pulley 79 mounted on a shaft 80 from which all of the moving parts of the machine may be operated. Mounted on shaft 80 is a gear 81 which meshes with and drives a gear 84 on shaft 72. Shaft 72 carries the lower roller 68 and the gear 84 drives a gear 85 mounted on the same shaft as the top roller 68. Gear 85 meshes with an idler gear 86 which drives a gear 87 mounted on the same shaft as the top roller 73. Gear 87 meshes with and drives gear 88 mounted on the same shaft with the lower roller 73.

Also engaging gear 80 is a gear 82 mounted on a shaft 83 which carries a number of cams 43a, 64a, and 53a for actuating the corresponding operating arms 43, 64, and 53 of the machine in properly timed relation as herein described.

On shaft 72 is a sprocket 89 which operates a chain 90 from which the fingers 20 project to move the folders along the bed of the machine. The chain 90 drives a shaft 91 by means of a sprocket 92. On this shaft 91 is a gear 93 which through a train of gears operates the feeder segment 14.

In the event that the feeding of the folders is discontinued for any reason, an automatic stopping device is provided. This device consists of a blade 94 which is allowed to move up and down by means of an attached slide rod 99 and a perforated bracket 95 mounted on the machine above the bed 18, through which the rod extends. The folders will hold the blade 94 up from the bed 18 and prevent the blade or a contact extension 100 thereof from coming into electrical contact with a fixed terminal 96 located above the blade 94. Should the blade 94 or the extension 100 move into contact with the terminal 96 by reason of the absence of a folder on the bed, or the presence of a folder which is too thick, the electrical circuit of a battery 97 or other source of current will be closed through conductors 101 and solenoid 98 and the core of such solenoid will withdraw the previously described pawl 33 from its ratchet wheel 35 into inoperative position, and the pawl will not function to rotate the tape feeding roll 31 notwithstanding the continued reciprocating movement of the rod 34 operating such member. As soon as a folder is fed into position 19, however, the circuit of the solenoid 98 will be broken and the pawl 33 will proceed to function in the regular way.

It will therefore be understood that the operation of the machine is automatic and continuous; the folders 10 are simply placed upon the inclined chute 11, they are fed under the blade 94 and moved along the bed 18 by the fingers 20 against the previously positioned seal 24 in the path thereof so that the seal is applied to the open edge of the folder and over the opposite sides thereof where it is held in place by the bed of the machine and the presser foot 66 until the sealed folder engages the rollers 68 and 73 which further compress and apply the seal and feed the sealed folders upon the delivery conveyor 74.

I claim:

1. In a folder sealing machine, a die for cutting a gummed seal, a rotary carrier having a radially projecting point upon which the cut seal is impaled for movement to the point of application, yielding means for confining the seal in the path of a folder to retain it as the projecting point is withdrawn, and means for moving a folder with its open edge against the seal and disengaging it from the said yielding means.

2. In a folder sealing machine, means for cutting seals from a tape, means for carrying a cut seal to a point of application to a folder, means forming a guideway for folders with a slot for receiving the cut seals, a spring in the slot for yieldingly engaging and holding each seal therein until it is engaged and carried along by a folder.

3. In a folder sealing machine, a guideway having a transverse slot, means for moving folders to be sealed in the guideway, means for positioning gummed seals across the slot in the path of the folders, and yielding means for holding a seal in position to be engaged by a folder, the sides of the guideway beyond the slot pressing the seal against the sides of the folders.

4. In a folder sealing machine, a seal-forming die, means to feed a tape to the die, means for feeding folders, means for transferring a seal from the die into and transversely of the path of an advancing folder, means to render the seal adhesive before reaching the folder, and means to retard the upper and lower portions of the seal after engagement by the folder edge to cause the bending of both portions of the seal about the edge of the advancing folder.

5. In a folder sealing machine, a seal-forming die, means to feed a gummed tape to the die, means for feeding a folder along a straight path, means for transferring a seal from the die along an arcuate path into and transversely of the path of an advancing folder, means to moisten a gummed seal before reaching the folder, and means to retard the upper and lower portion of the seal after engagement by the folder edge to cause the bending of the seal about the edge of the folder and to compress the upper and lower portions thereof upon the upper and lower faces of the folder.

6. In a folder sealing machine, a seal-forming die, a tape, means to feed the tape to the die, means to actuate the tape feed and the die alternately, a seal carrier for transporting the seal from the die into and transversely of the path of the folder, means to render the seal adhesive after leaving the die, means to feed a folder transversely of the path of the seal, means to release the seal from the carrier at the moment of engagement with the advancing edge of the folder, and means to bend the seal over the folder edge.

7. In a folder sealing machine, a seal-forming die, a gummed tape, means to feed the tape to the die, means to actuate the tape and die alternately, a seal carrier arm provided with an impaling pin for transporting the seal from the die into and transversely of the path of a folder, means to moisten the gummed seal after leaving the die, means to feed a folder transversely of the path of the seal, cam means to withdraw the impaling pin from the seal at the moment of engagement with the advancing edge of the folder, and means to bend the seal into adhering contact with the upper and lower face of the folder.

8. In a folder sealing machine, means for feeding folders, in succession, means for feeding a gummed tape, a die for blanking out seals from the gummed tape, an oscillating arm with impaling pin for transporting a previously gummed seal from the die along an arcuate path converging towards and ultimately intersecting the path of a folder, means disposed along such arcuate path to moisten the gummed seal to render the same adhesive, spaced means between which the seal is pressed by the advancing folder and bent over the folder edge, and means for withdrawing the impaling pin from the seal concurrently with the engagement between the folder and seal.

9. In a folder sealing machine, means for feeding folders therethrough, means for feeding a seal into and transversely of the path of an advancing folder, means for bending the seal about the edge of the folder and to cause adherence therebetween, the seal-feeding means comprising an arm arranged to swing about a pivot point in an arc between a seal-receiving position and a seal-delivering position, a pin slidable longitudinally of the arm, means to project the pin into impaling engagement with the seal at the die and to retract the pin to release the seal when the latter is engaged by the advancing folder edge.

10. In a folder sealing machine, means for feeding folders therethrough, means for feeding a seal into and transversely of the path of an advancing folder, means for bending the seal about the edge of the folder and to cause adherence therebetween, the seal-feeding means comprising an arm arranged to swing about a pivot point in an arc between a seal-receiving position and a seal-delivering position, a pin angularly offset from the arm and slidable longitudinally of the arm, cam means to project the pin into impaling engagement with the seal at the die and to retract the pin to release the seal when engaged by the advancing folder edge, the seal being rendered adhesive during its passage between the die and the folder engaging position.

11. In a folder sealing machine, means for feeding folders therethrough, a tape, a die for blanking seals from the tape, means for feeding the tape and reciprocating the die alternately in timed relation, means for feeding a seal from the die into and transversely of the path of an advancing folder, means for bending the seal about the edge of the folder and to cause adherence therebetween, the seal-feeding means comprising a housing having an arcuate outer face, a guide having an inner arcuate face slightly spaced from the outer face of the housing, the arcuate face of the housing extending between the die and the folder path, a carrier arm pivoted at the center of the housing and arranged to swing from a position in line with the die to a position intersecting the folder path at an acute angle, means for intermittently swinging the carrier arm between its extreme positions, a seal-impaling pin mounted for reciprocatory movement longitudinally of the arm, means for projecting the pin into engagement with the seal at the die and for retracting the pin out of engagement with the seal after delivering the same into the path of an advancing folder, and a moist pad associated with the housing in a position to be traversed by the seal while passing over the outer face of the housing beneath the arcuate guide whereby to render the seal adhesive during its passage between the die and its point of engagement by the folder.

12. In a folder sealing machine, means for feeding folders therethrough, a gummed tape, a die for blanking seals from the tape, means for feeding the tape and reciprocating the die alternately in timed relation, means for feeding a gummed seal from the die into and transversely of the path of an advancing folder, means for bending the seal about the edge of the folder and to cause adherence therebetween, the seal-feeding means comprising a housing having an arcuate outer face with circumferentially extending spaced corrugations, a guide having an inner arcuate face slightly spaced from the outer face of the housing, the arcuate face of the housing extending between the die and the folder path, the housing provided with a coextensive circumferential slot, a carrier arm pivoted at the center of the housing and arranged to swing from a position in line with the die to a position intersecting the folder path at an acute angle, means for intermittently swinging the carrier arm between its extreme positions, a seal-impaling pin mounted for reciprocatory movement longitudinally of the arm in line with the slot, cam means for projecting the pin into engagement with the seal at the die, and for retracting the pin out of engagement with the seal after delivering the same into the path of an advancing folder, and a moist pad associated with the housing in a position to be traversed by the gummed side of the seal while passing over the outer face of the housing beneath the arcuate guide whereby to render the seal adhesive during its passage between the die and its point of engagement by the folder.

EAROSS J. SIMON.